United States Patent [19]

Lynch

[11] Patent Number: 4,823,039

[45] Date of Patent: Apr. 18, 1989

[54] ELECTRICAL MACHINES

[76] Inventor: Cedric Lynch, 8 Heath Dr., Potters Bar, Hertfordshire, England, EN6 1EH

[21] Appl. No.: 944,234

[22] Filed: Dec. 18, 1986

[30] Foreign Application Priority Data

Dec. 18, 1985 [GB] United Kingdom ............. 8531212

[51] Int. Cl.$^4$ ............................................. H02K 1/22
[52] U.S. Cl. .................................... 310/268; 310/190; 310/191; 310/207; 310/237; 310/254
[58] Field of Search ............... 310/268, 115, 254, 116, 310/83, 42, 152, 154, 155, 207, 237, 136, 140, 219, 230, 101, 190, 191, 93, 103

[56] References Cited

U.S. PATENT DOCUMENTS

| 3,566,165 | 2/1971 | Lohr . | |
|---|---|---|---|
| 3,648,360 | 3/1972 | Tucker | 310/268 |
| 3,822,390 | 7/1974 | Janson | 310/268 |

FOREIGN PATENT DOCUMENTS

| 0008049 | 2/1980 | European Pat. Off. . | |
|---|---|---|---|
| 1181796 | 11/1964 | Fed. Rep. of Germany | 310/268 |
| 2314591 | 10/1973 | Fed. Rep. of Germany | 310/268 |
| 2550416 | 5/1977 | Fed. Rep. of Germany | 310/154 |
| 1232489 | 8/1960 | France . | |
| 1426280 | 12/1965 | France . | |
| 1433531 | 2/1966 | France . | |
| 1496835 | 10/1967 | France . | |
| 0353071 | 5/1961 | Switzerland . | |
| 0832904 | 4/1960 | United Kingdom . | |
| 0836420 | 6/1960 | United Kingdom . | |
| 0925293 | 5/1963 | United Kingdom . | |
| 0926934 | 5/1963 | United Kingdom . | |
| 0955408 | 4/1964 | United Kingdom . | |
| 0992896 | 5/1965 | United Kingdom . | |
| 1051467 | 12/1966 | United Kingdom . | |
| 1072992 | 6/1967 | United Kingdom . | |
| 1133797 | 11/1968 | United Kingdom . | |
| 1153780 | 5/1969 | United Kingdom . | |
| 1170637 | 11/1969 | United Kingdom . | |
| 1172372 | 11/1969 | United Kingdom . | |
| 1193014 | 5/1970 | United Kingdom . | |
| 1509469 | 5/1978 | United Kingdom . | |
| 1545227 | 5/1979 | United Kingdom . | |
| 0325287 | 2/1980 | United Kingdom . | |
| 2059175 | 9/1980 | United Kingdom . | |
| 2060270 | 4/1981 | United Kingdom . | |
| 2081521 | 2/1982 | United Kingdom . | |
| 2103429 | 2/1983 | United Kingdom . | |
| 0966588 | 6/1984 | United Kingdom . | |
| 8002088 | 10/1980 | World Int. Prop. O. | 310/268 |

OTHER PUBLICATIONS

Principles of Electricity Illustrated; R. C. Norris; 1961; (3 pages).
"The Penguin Dictionary of Physics"; V. H. Pitt; 1977; 3 pages; Gr. Britain.

Primary Examiner—R. S. Skudy
Attorney, Agent, or Firm—Hopgood, Calimafde, Kalil, Blaustein & Judlowe

[57] ABSTRACT

There is disclosed a rotor for an electrical machine, the rotor having a current-carrying winding comprising a plurality of circumferentially distributed winding portions which lie in at least one plane perpendicular to the rotor axis, and extend from a radially inner region to a radially outer region. A commutator is provided by surfaces of the winding portions at the inner region, and the winding is formed from a plurality of conductive sections, each having ends which lie at said outer region, interconnections between the winding sections being made only by way of those ends. Thus, soldered connections made between the winding sections will be remote from the commutator, which is the main source of heat for overheating, and moreover will be at positions where air cooling due to rotor movement is greatest. Air gaps between the winding portions at the outer region aid this cooling affect even further.

21 Claims, No Drawings

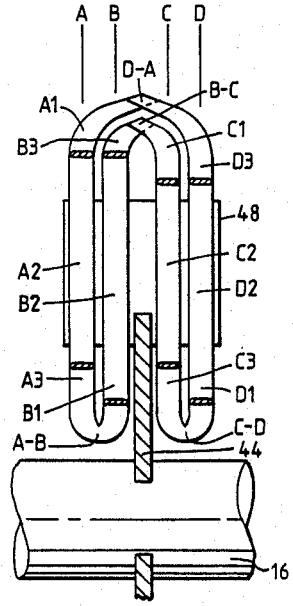

ELECTRICAL MACHINES

BACKGROUND OF THE INVENTION

One aspect of this invention relates to electrical machines which convert mechanical energy into electrical energy, or vice versa, by an interaction between a magnetic field and an electric current. Examples of such machines are electric motors, dynamos and alternators. A further aspect of the invention relates to rotors for such machines.

In a dynamo having a field coil to produce the dynamo's magnetic field, it is well known to vary the electrical output of the dynamo by varying the field current. This way of varying the electrical output of an electrical machine is not possible, however, in the case of a machine whose magnetic field is provided by one or more permanent magnets.

BRIEF DESCRIPTION OF THE INVENTION

In accordance with one aspect of the present invention, there is provided an electrical machine in which a current carrying member is acted upon by and movable relative to magnets disposed to opposite sides of the current carrying member, a pair of magnetic field diverting members being disposed to the opposite sides of the current carrying member between the magnets and the current carrying member, and the diverting members being coupled together for movement in opposite directions relative to the magnets to vary the proportion of the magnetic field produced by each magnet which flows through the current member.

Thus, the magnetic field can be produced by permanent magnets and yet the degree of interaction between the magnetic field and the electric current can be varied, by diverting the magnetic field.

Preferably, the field diverting members can be moved to vary the degree of diversion of the magnetic field progressively. Thus, in the case of a motor, the speed and/or torque can be varied progressively, and, in the case of a generator, the electrical output can be varied progressively.

Preferably, the machine has on opposite sides of the current carrying member respective first and second series of alternately oppositely polarised magnets each spaced from said current carrying member, each diverting member having a series of elements movable in the spaces between the magnets of the corresponding series and the current carrying member.

Preferably, each series of magnets and each series of diverting elements are each arranged in a circle, the diverting member being rotatable about the centers of the respective circles, and the series of magnets and diverting elements are preferably centred on an axis of the current carrying member. Preferably, the current carrying member is a rotor rotatable about the axis, the series of magnets and the diverting member or members forming a stator assembly.

In accordance with another aspect of the invention there is provided an electrical machine in which a disc-shaped current carrying rotor is acted upon by and rotatable relative to a series permanent magnets arranged in a circle centred on the rotor axis to provide a stator producing a magnetic field with which the current in said rotor interacts, said series comprising at least first and second circular subseries which are relatively rotatable about the axis to vary the interacting field.

Preferably the two series comprise corresponding pluralities of regularly, circumferentially spaced magnets, each spaced from the current carrying member, means being provided for displacing one sub-series relative to the other so as to alter the state of mutual registration between said first and second sub series. The magnets in each sub-series are preferably alternately oppositely polarized, the maximum field being achieved when magnets of the first and second sub-series of like polarization are mutually registered, the minimum field being achieved when magnets of the first and second sub-series of opposite polarization are mutually registered.

The machine may have a further series of permanent magnets, again arranged in a circle centred on the rotor axis and again divided into first and second sub-series, the current carrying member being sandwiched between the two series of permanent magnets. The two displaceable sub-series may be coupled together for movement in the same, or more preferably, opposite directions.

For the or each series of magnets there may be provided a corresponding series of magnetically permeable fixed pole pieces arranged in a circle, the magnets of one sub-series being attached to first portions of the pole pieces, and the magnets of the displaceable sub-series being registrable with second portions of the pole pieces.

In accordance with a further aspect of the invention, there is provided a rotor for an electrical machine, the rotor having a current-carrying winding comprising a plurality of circumferentially distributed winding portions which lie in at least one plane perpendicular to the rotor axis and extend from a radially inner region to a radially outer region, and a commutator provided by surfaces of the winding portions at said inner region, the winding being formed from a plurality of conductive sections each having ends which lie at said outer region, interconnections between said winding sections being made only by way of said ends at said outer region.

Accordingly, the winding can be constructed from a number of identical such sections, and the risk of damage at the joints between the sections due to overheating is minimized since the joints are at the outer region of the winding, which is remote from the commutator where most heat is generated, the cooling effect due to rotation of the rotor also being greatest in this outer region. This is particularly advantageous where soldered joints are used.

The sections are made from metal (e.g. copper) strip (e.g. stampings), the surfaces providing the commutator being edge surfaces of said metal strip.

Preferably, gaps are provided between the winding portions at said outer region. This enhances the cooling affect on the winding joints, and also aids the procedure for forming he joints, as will be described later herein.

This aspect of the invention is particularly applicable to a wave-wound rotor in which the winding extends primarily in a plurality of parallel planes perpendicular to the rotor axis, and conveniently in four parallel planes.

The rotor preferably also has ferromagnetic material disposed between the winding portions to promote conduction of the magnetic field axially of the rotor.

Preferably, the ferromagnetic material (which may be of, for example, mild steel, silicon steel or soft iron)

is provided in the form of sheets the planes of which extend axially and radially of the rotor. The sheets may be provided by laminated layers.

In this aspect of the invention the magnetic field is preferably provided by magnets or coils on both sides of the rotor. A compared with an arrangement with magnets or coils on only one side of the rotor, this arrangement produces a greater magnetic field and thus, in the case of a DC motor, a greater torque for a given current and less speed for a given voltage. Because the motor is caused to run slower, friction losses are reduced and thus efficiency is increased. The same effect occurs in the case of a DC generator, that is to say for a given speed the voltage is greater and for a given torque the current is less. Thus, the ohmic losses are reduced and thus efficiency is increased.

BRIEF DESCRIPTION OF THE DRAWINGS

There follows a description, by way of example, of specific embodiments of the present invention, reference being made to the accompanying drawings, in which.

DETAILED DESCRIPTION

Figure 1:
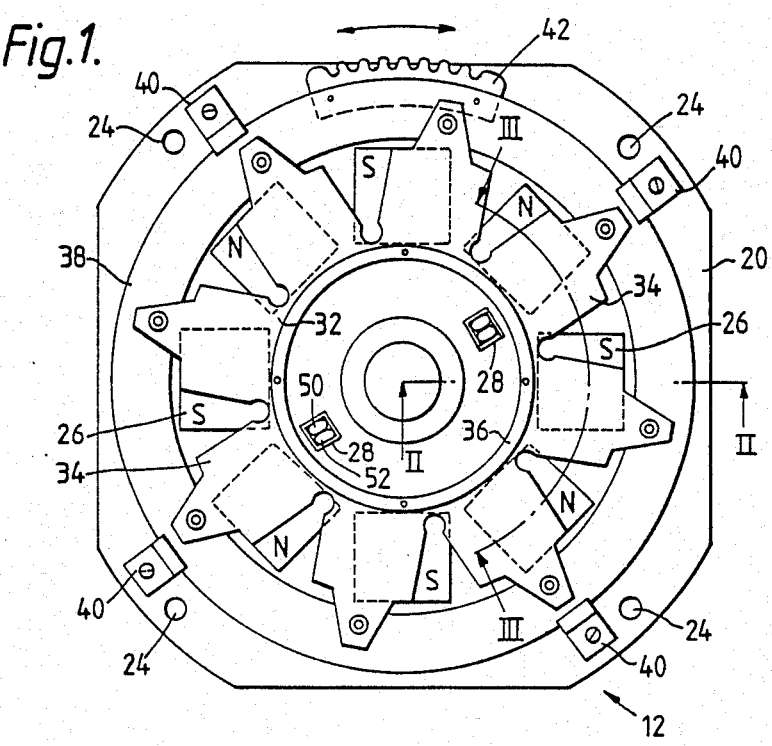
FIG. 1 is a view of a stator assembly of a motor in accordance with a first embodiment of the invention.
Figure 2:
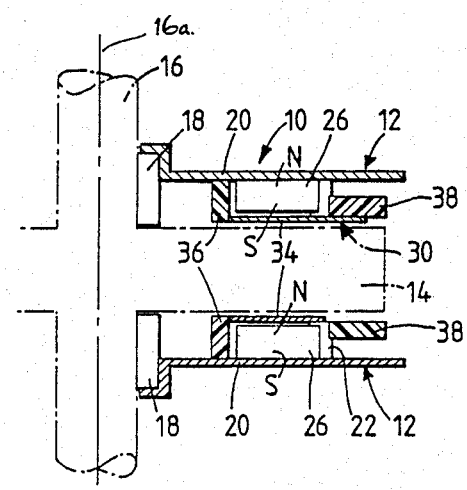
FIG. 2 is half section view of the motor on the line II—II in FIG. 1, with the rotor shown in outline.

Referring to FIGS. 1 and 2, a DC motor 10 comprises a pair of stator assemblies 12 and a rotor 14 mounted on a shaft 16 having an axis 16a which is rotatably mounted by bearing 18 with respect to the stator assemblies 12.

Each stator assembly comprises a steel stator plate 20, and the two plates 20 are held together by four posts 22 extending through respective holes 24 in the plates. Eight permanent magnets 26 are bonded in a circular arrangement to each stator plate alternately by their north-seeking and south-seeking faces, and thus the faces of the magnets facing the rotor are alternately north and south-seeking. Furthermore, the magnets on one plate which have north-seeking faces facing the rotor are opposite magnets on the other plate having south-seeking faces facing the rotor and vice versa. Thus, as described so far, each magnet is in two primary magnet circuits, one being through the magnet, the rotor, the opposing magnet on the other stator plate, that other stator plate, one of the magnets next to that opposing magnet, the rotor, one of the magnets next to magnet in question, the stator plate on which the magnet in question is mounted and back to the magnet in question. The other magnetic circuit is similar, except that it passes through the other magnet next to the opposing magnet and through the other magnet next to the magnet in question.

Electric current is passed to the rotor via brushes 28 and commutators on the rotor, and flows along generally radial current conductors in the rotor. Thus, the electric current interacts with the magnetic fields to cause the rotor to rotate.

A steel diverting member 30 is mounted on each stator plate 20. Each diverting member comprises a narrow annular portion 32 from which eight petal portions 34 radiate. The annular portion is slidable around an annular plastics boss 36 secured to the stator plate. The outer end of each petal portion 34 is secured to an annular plastics member 38 which is rotatably held on the stator plate by four brackets 40 so that the petal portions 34 are slidable on the faces of the magnets 26. A gear segment 42 is secured to the annular member 38 and a common drive gear (not shown) cooperates with the gear segments 42 of both stator assemblies 12 to rotate the diverting members in opposite directions. The maximum rotation of each diverting member is one sixteenth of a turn, and the arrangement is set up such that at one limit of rotation each petal portion 34 overlies a respective magnet 26, as shown in FIG. 3A, and at the other limit each petal portion 34 partly and equally overlies two adjacent magnets 26, as shown in FIG. 3B.

Figure 3A:
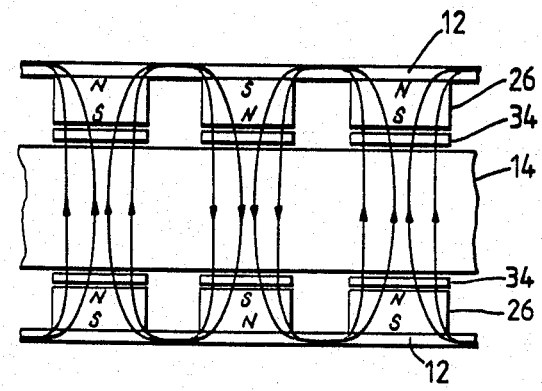
FIGS. 3A and 3B are sectioned schematic developments of the motor on the line III—III in FIG. 1.
Figure 3B:
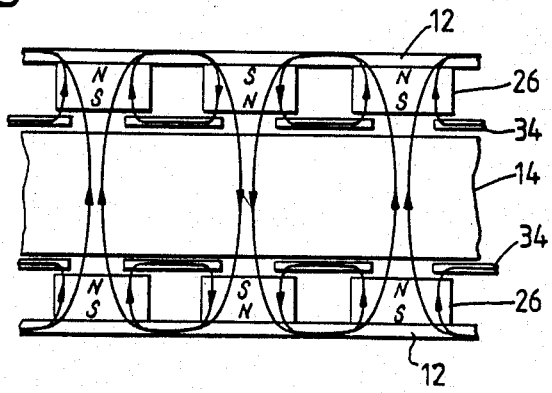

Lines representative of the magnetic fluxes in the stator assemblies and rotor are shown in FIGS. 3A and 3B, and from a comparison of the two drawings it will be noted that the magnetic flux threading the rotor with the petal portions 34 in the position shown in FIG. 3B is less than that with the petal portions in the FIG. 3A position, because in the former case part of the magnetic flux produced by two adjacent magnets is "short-circuited" via the respective petal portions 34. A the petal portions 34 are progressively moved between the two positions shown in FIGS. 3A and 3B, the magnetic flux threading the rotor 14 is progressively varied, and thus the torque and/or speed of the motor is progressively varied.

Figure 4:
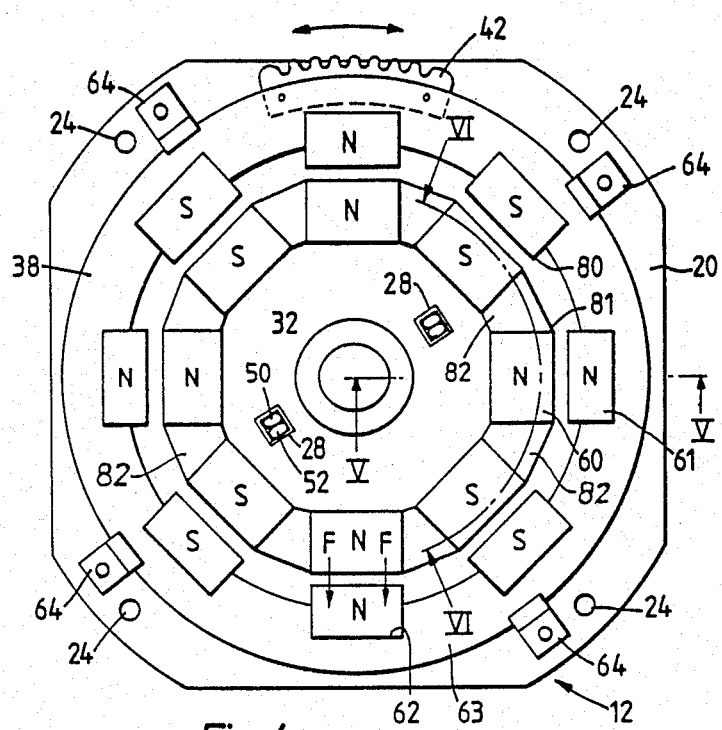
FIG. 4 is a view of a stator assembly of a motor in accordance with a second embodiment of the invention.
Figure 5:
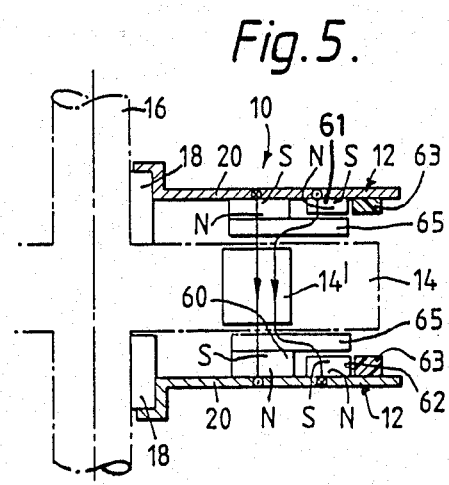
FIG. 5 is a half section view of the motor or the line V—V in FIG. 4, with the rotor shown in outline and the the magnets positioned for maximum field.
Figure 6:
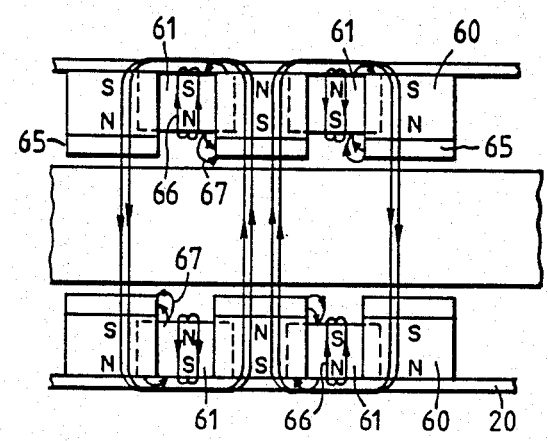
FIG. 6 is a sectioned schematic development of the motor on the line VI—VI in FIG. 4 with the magnets positioned for intermediate field.
Figure 7:
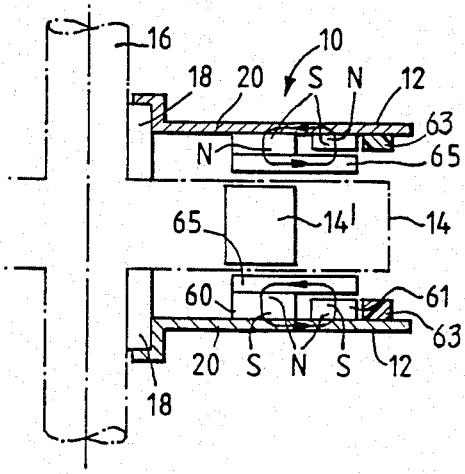
FIG. 7 is a half section view, similar to FIG. 5 showing the motor with the magnets positioned for minimum field.

In the second embodiment of the stator assembly, shown in FIG. 4 to 7 (in which elements common to this and the first embodiment are indicated by like reference numerals) the magnetic field is produced by eight pairs of permanent magnets on each assembly, arranged in two concentric circles centred on the axis of the rotor. More particularly, eight magnets 60 are bonded to each stator plate alternatively by their north-seeking and south-seeking faces. As in the first embodiment the magnets 60 on one plate which have north-seeking faces facing the rotor are opposite magnets on the other plate having south-seeking faces facing the rotor and vice-versa. Each stator assembly includes eight further magnets 61 circumferentially spaced for radial registration with the magnets 60, these further magnets being located in corresponding cut-outs 62 formed in the inner edge of a plastics retaining ring 63 which is rotatably held to the stator plate by brackets 64, so that the circle of magnets 61 can rotate relative to the inner circle of magnets 60. Again, a gear segment 42 is secured to the ring 63 and a common drive gear (not shown) co-operates with the gear segments 42 of both stator assemblies 12 to rotate the further magnets 61 in opposite directions. The maximum rotation of each ring 63 is in this case one eighth of a turn, and the arrangement is set up such that at one limit of rotation the circles of magnets 60 and 61 are in mutual register as shown in figures 4 and 5 with corresponding poles of the registered magnets facing the rotor and at the other limit each pair of registered magnets has opposite poles facing the rotor, as shown in FIG. 7.

As can be seen from FIGS. 5 and 7, each of the fixed magnets 60 is attached to a radially inner portion of a respective magnetically permeable soft iron pole piece 65 (omitted from FIG. 4 for the sake of clarity) lying adjacent the rotor 14. The magnets 61, when registered with the magnets 60, each lie adjacent a radially outer portion of a corresponding pole piece. These pole pieces concentrated the lines of magnetic flux into the rotor. The outer magnets 61 lie radially outwardly of a magnetically permeable core 14' of the rotor, and the pole pieces 65 direct the flux from these magnets inwardly, as shown in FIG. 5, to flow through the core 14'.

In the position of the ring 63 of figures 4 and 5, the magnetic flux threading the rotor is maximum, since the magnetic field due to the magnets 60 is reinforced by that of the magnets 61. However, when the ring 63 is rotated to move the magnets 61 away from the pole pieces 65, the flux threading the rotor is weakened as some of the flux due to the magnets 61 leaks away to form a magnetic closed circuit with the stator plate, and some leaks to the next adjacent pole piece. For example, FIG. 6 illustrates the situation when the ring 63 has rotated one sixteenth of a turn to position the magnets 61 mid-way between the magnets 60. This figure shows at 66 the flux leaking to the stator plate 20 and at 67 the flux which "short circuits" to and form the next adjacent pole pieces 65.

As the ring 63 is progressively moved away from the position of figured 4 and 5 the proportion of magnetic flux which leaks increases and thus the torque and/or speed of the motor is progressively varied.

FIG. 7 illustrates the situation when the ring 63 has moved one eighth of a turn to place magnets 61 whose North-seeking poles face the rotor adjacent magnets 60 whose South-seeking poles face the rotor, and the vice versa. In this condition each pair of magnets 60/61 forms a closed magnetic circuit with the corresponding pole piece 65 and the stator plate 20, and no flux threads the rotor. There is accordingly, no torque applied to the rotor.

The magnets 61 may be quite loosely located in the cut-outs 62. When registered as in FIG. 4 with like polarized magnets 60 the magnets 61 will be firmly seated in the cut-outs by the radially-acting repelling force F. To avoid the magnets 61 jamming at their leading corners 80 (assuming clockwise rotation of ring 63 in FIG. 4) against the corners 81 of the fixed magnets 60, the circumferential gaps between the magnets 60 are filled with a plastics material 82. As can be seen from FIG. 5, the magnets 61 are constrained in an axial direction by the stator plate 20 and the outer face of the pole pieces 65.

Figure 8:
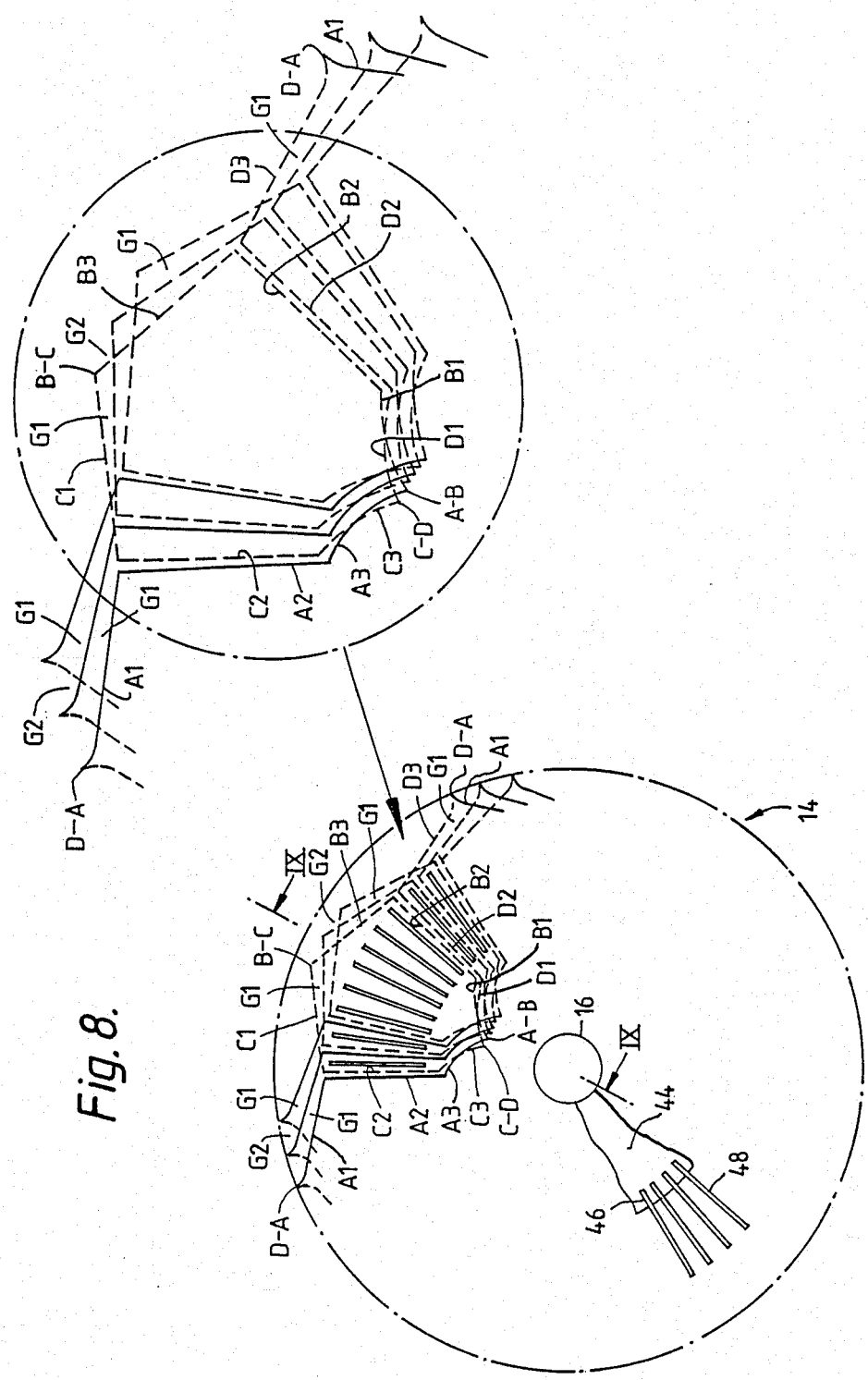
FIG. 8 is a schematic view of the rotor showing the winding pattern.
Figure 9:
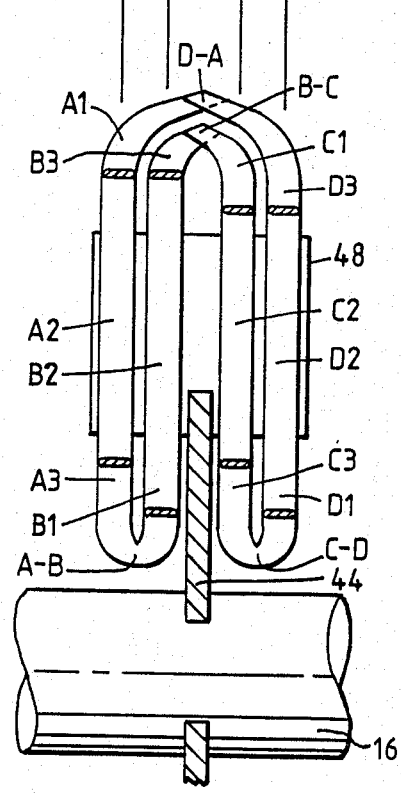
FIG. 9 is a sectional view taken along the line IX—IX in FIG. 8.
Figure 1:
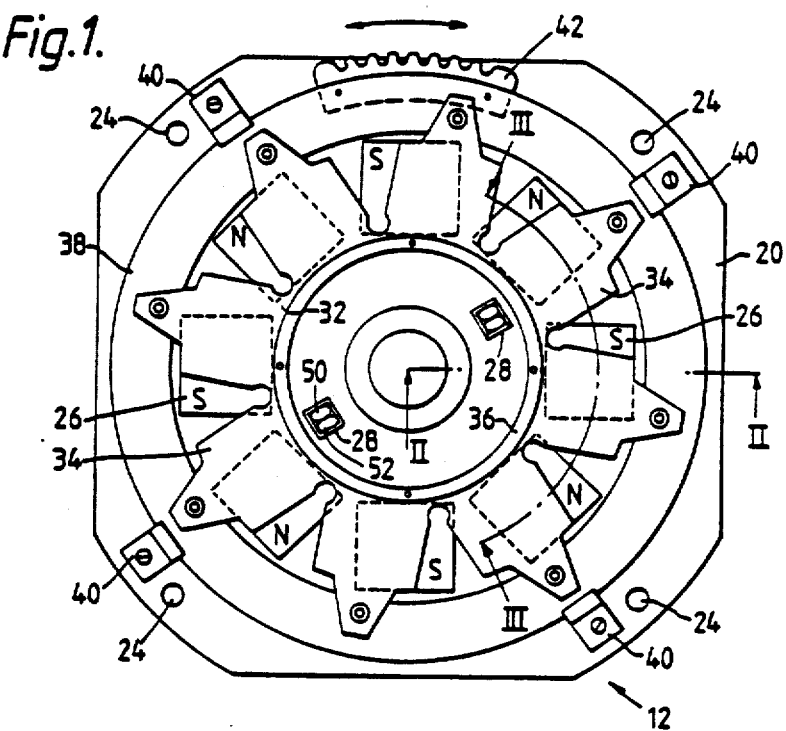
Figure 2:
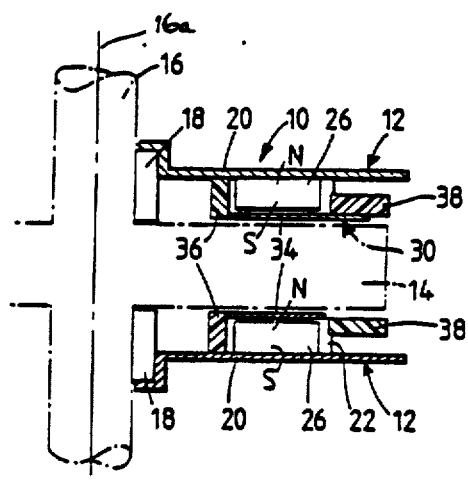
Figure 3A:
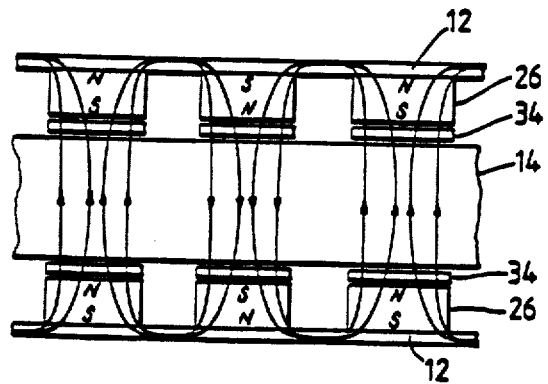
Figure 3B:
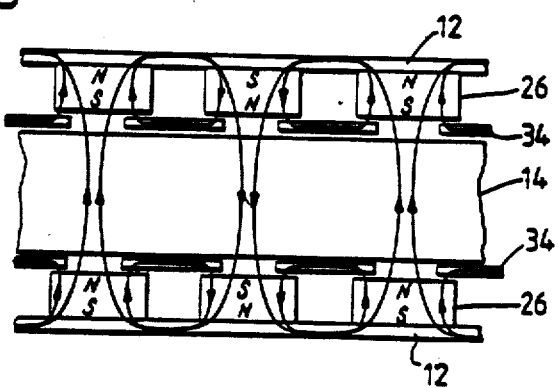
Figure 4:
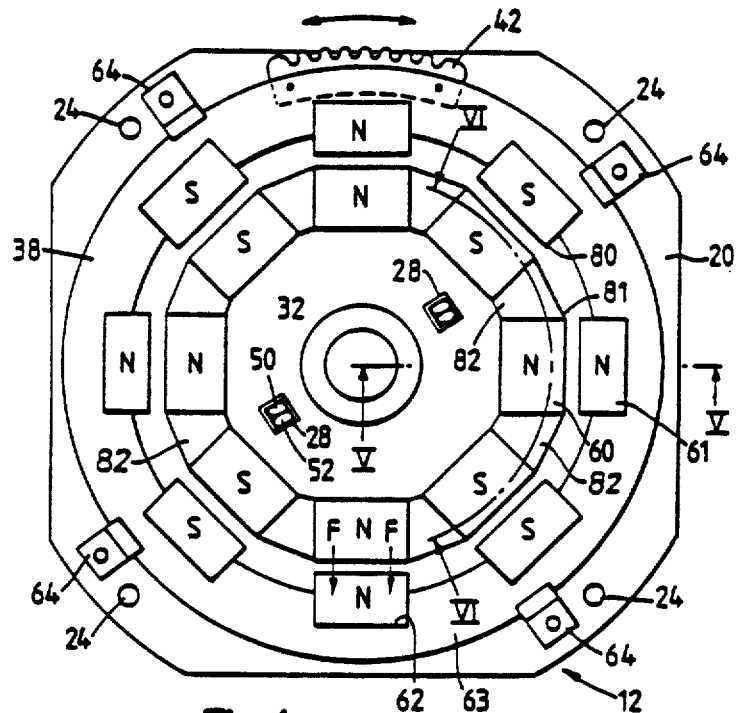
Figure 5:
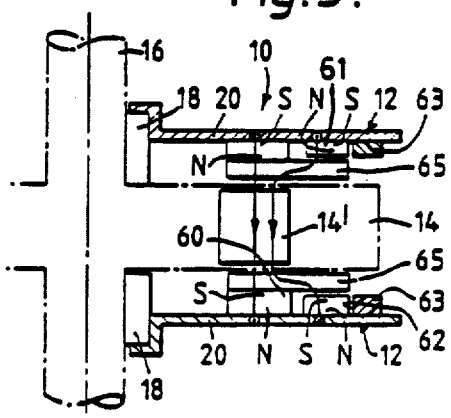
Figure 6:
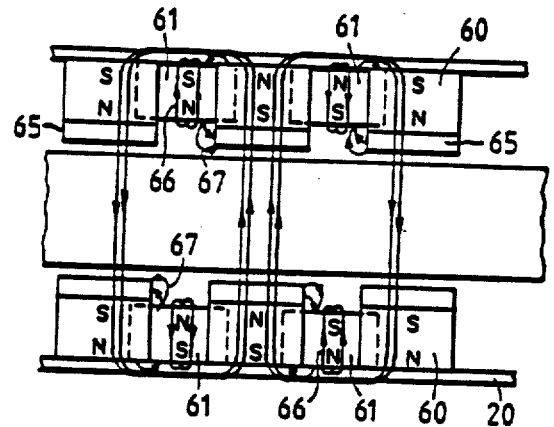
Figure 7:
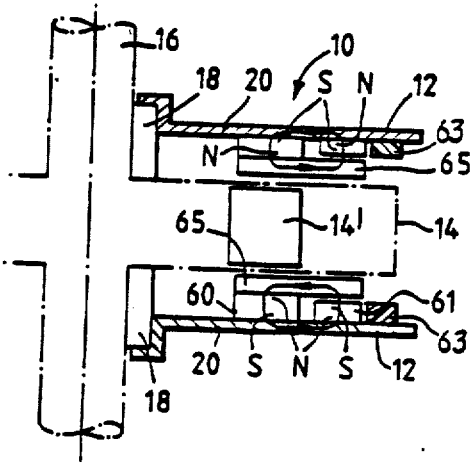

Referring to FIGS. 8 and 9, the rotor 14 is a wave-wound disc rotor. A circular plate 44 is mounted on the rotor shaft, the periphery of the disc having 65 cut-outs 46. One or more rectangular stampings 48 of ferromagnetic sheet material are mounted in each cut-out such that the plane of the stamping is at right angles to the paper of FIG. 8. The stampings are preferably of mild steel, silicon steel, or soft iron and form the above-mentioned core 14'. Copper strip is then wound on the rotor around the stampings to provide the current carrying winding of the rotor.

The winding lies generally in four parallel planes A,B,C,D the rotor planes A and D being adjacent opposite faces of the rotor, and the planes B and C being intermediate planes A and D. There are 130 section to the winding each pair of which sections progresses as follows: portion A1 in plane A extends from the periphery of the rotor to the stampings; thence portion A2 extends radially inwards between two stampings; thence portion A3 extends to an inner limit of the winding where the section is bent and therefore integrally formed with bridging portion A-B into plane B; thence portion B1 extends to the stampings; thence portion B2 extends radially outward between two stampings, there being eight stampings between portions A2 and B2; thence portion B3 extends to a position B-C partway between the stampings and the outer periphery of the rotor, at which the winding section is soldered to the next winding section which extends as portion C1 in plane C to the stampings; thence portion C2 extends radially inwards between the same two stampings as portion A2, thence portion C3 extends to the inner limit of the winding where the section is bent and therefore integrally formed with bridging portion C-D into plane D; thence portion D1 extends to the stampings; thence portion D2 extends radially outwardly between the same two stampings as portion B2; thence portion D3 extends to the outer periphery of the rotor where it is soldered at position D-A to a portion A1 of a further pair of winding sections. The portion A2 of this further pair of winding sections extends radially inwardly between two stampings, there being sixteen stampings between this portion A2 and the portion A2 of the first pair of winding sections. Winding of the rotor continues in this manner so that in total there are 65 pairs of winding sections, the portion D3 of the 65th pair being soldered at a position D-A to the portion A1 of the first pair. Thus, the winding forms one continuous loop.

An important feature of the rotor is that the outwardly facing edges of the copper strip forming the winding portions A3 and D1 are directly engaged by the branches 28 and therefore provide two commutators of the rotor. The copper strip is relatively wide at the commutator in the axial direction of the rotor, and thus the commutator will have a long life. Furthermore, there are no soldered connections at an inner region of the rotor adjacent the commutator, these connections being made only at the outer periphery, where the cooling effect of the rotor movement is greatest, and thus any over-heating at the commutator is unlikely to cause failure of the rotor.

Gaps G1 are provided between circumferentially adjacent A1 portions, B3 portions, C1 portions and D3 portions, leading to corresponding gaps G2 between D-A soldered connections and B-C soldered connections. These gaps enhance air-cooling at the outer parts of the winding segments, reducing even further the possibility of damage to the soldered connections by over-heating. The avoidance of the need for connections at the inner region of the rotor, and the provision of the gaps G2 at the periphery combine to serve the additional advantage of affording proper access to the ends to the winding sections for the making of the necessary soldered connections.

The motor is fitted with brushes, each brush having a commutator engaging carbon sintered copper part 50 which is highly conductive and a lubricative carbon part 52 as seen in FIG. 1. The two parts may be bonded together or may be mounted independently but side-byside in the brush holder. The carbon part acts not only as a lubricant for itself, but also for the copper-based part, and thus the life of the copper-based part is improved.

Various modifications may be made of the machine described above. For example, instead of diverting the magnetic field by mechanical means, or by permanent magnets auxiliary field coils may be fitted to the stator to influence the magnetic circuits produced by the permanent magnets. Moreover, the particular construction of armature described above may be used with conventional stators. Also each circle of magnets (26 in FIG. 1; 60 and 61 in FIG. 4) can be provided by a continuous ring of a material which can be locally magnetized at circumferentially spaced positions. This would be particularly advantageous in the embodiment of FIGS. 4 to 7, as the assembly of magnets 61 in the plastics retaining ring 63 would be replaced by a simpler and more reliable one-piece ring member.

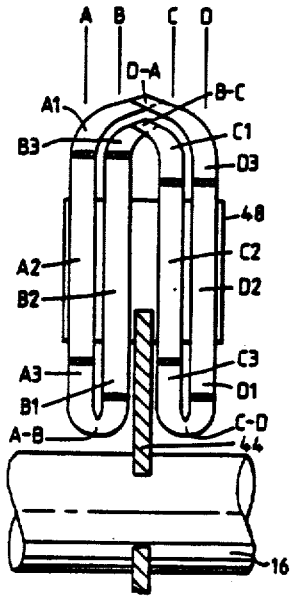

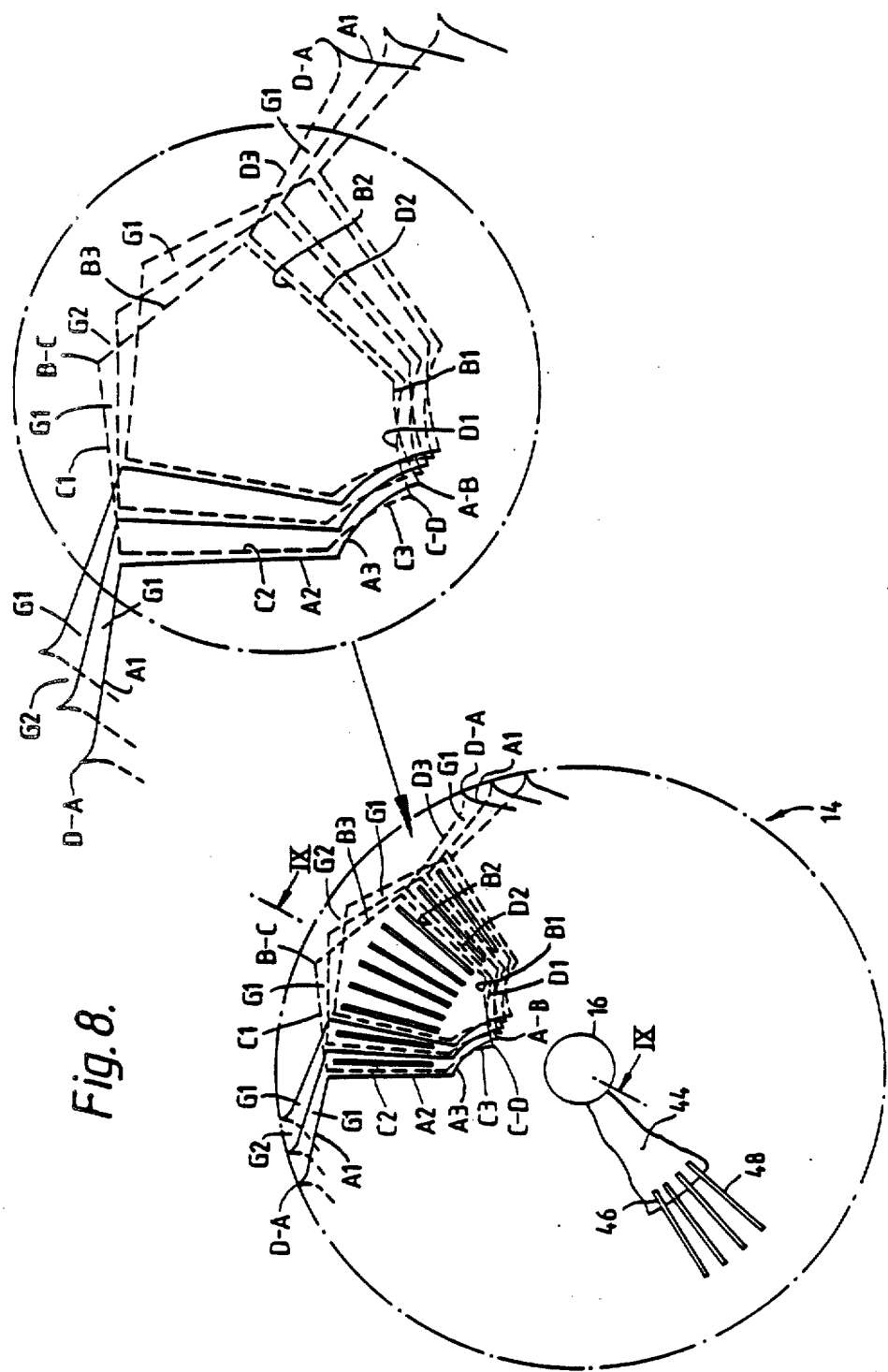

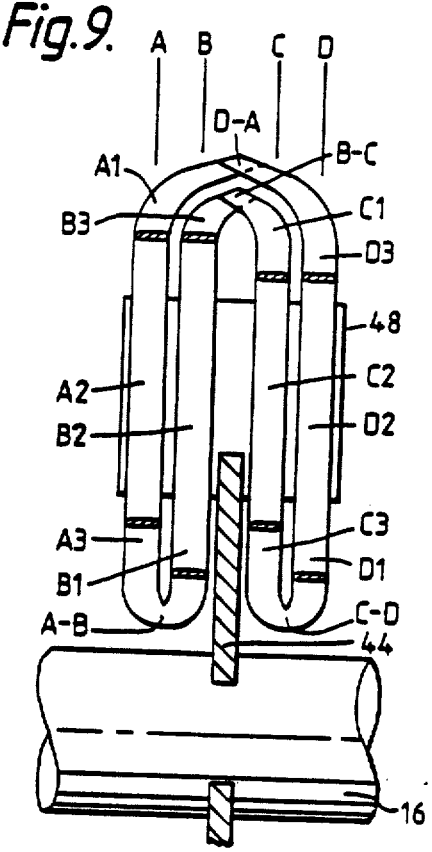

I claim:

1. A rotor for an electrical machine, the rotor having a rotor axis and a current-carrying winding comprising a plurality of circumferentially distributed winding portions which lie in a plurality of planes perpendicular to said rotor axis, said winding portions extending from a radially inner region to a radially outer region, and a commutator provided by surface of the winding portions at said inner region, the winding being formed from a plurality of integrally formed conductive sections each having first and second ends, both of which lie at said outer region, and comprising first and second main portion which extend from respective ones of said ends inwardly in respective ones of said planes to the inner region and an inner bridging portion extending between said planes and providing integral connection between said main portions at said radially inner region of the rotor, interconnections between the said conductive sections being made only by way of said ends at said outer region, the conductive sections each comprising metal strip, the surface providing the commutator being edge surface of the metal strip, said edge surface facing in the direction of said rotor axis.

2. A rotor according to claim 1, wherein gaps are provided between the winding portions at said outer region.

3. A rotor according to claim 1 wherein said interconnections are made by soldering.

4. A rotor according to claim 1 wherein said rotor is wave-wound and in which the winding extends in a plurality of parallel planes at right angles to the rotor axis.

5. A rotor according to claim in combination with a stator for producing a magnetic field for interaction with current flowing in the rotor, and means to divert the magnetic field to vary the interaction.

6. A rotor according to claim 6 wherein the stator includes a series of alternately oppositely polarized permanent magnets arranged in a circle, and each spaced from the rotor, the diverting means including a corresponding series of diverting members moveable in the spaces between the permanent magnets and the rotor to vary the proportion of the magnetic field produced by each of the permanent magnets which flow through the rotor and the proportion which is short-circuited to adjacent of said permanent magnets in the series.

7. A rotor according to claim 6 and having a further such series of permanent magnets and further such diverting member, the rotor being sandwiched between the diverting members, the diverting members being sandwiched between the two series of permanent magnets, and the diverting members being coupled to move together.

8. A rotor according to claim 5 wherein the stator includes a series of permanent magnets, said series comprising first and second sub-series which are arranged in respective concentric circles centred on the rotor axis, and which are relatively rotatable about said axis to vary the interacting field.

9. A rotor according to claim 8 wherein the each said sub-series the permanent magnets are alternately oppositely polarized, and are circumferentially spaced so as to be radially registrable with the permanent magnets of the other sub-series, registration of similarly polarized permanent magnets of said first and second sub-series providing the maximum magnetic field strength.

10. A rotor according to claim 8 and having a further said series of permanent magnets comprising further first and second sub-series, the rotor being sandwiched between the two series of permanent magnets.

11. A rotor according to claim 1, further comprising pieces of ferromagnetic material disposed between said winding portions to promote conduction of magnetic field axially of the rotor.

12. A rotor according to claim 11 wherein said pieces of ferromagnetic material comprise sheets, the planes of which extend axially and radially of the rotor.

13. An electrical machine including a rotor according to claim 1 or claim 11 and a stator for producing a magnetic field for interaction with current flowing in the rotor, said stator comprising magnetic elements on both axial sides of the rotor.

14. An electrical machine in which a current carrying member is acted upon by and rotatable relative to magnets disposed to opposite sides of the current carrying member, a pair of magnetic field diverting members being disposed to the opposite sides of the current carrying member between the magnets and the current carrying member, and the diverting members being coupled together for movement in opposite directions relative to the magnets to vary the proportion of the magnetic field produced by each magnet which flow through the current carrying member.

15. A machine according to claim 14 wherein each magnet is a permanent magnet.

16. A machine according to claim 14 wherein the magnets are arranged in concentric circles on opposite sides of the current carrying member, and wherein the diverting members are rotatable about the centres of said circles.

17. A machine according to claim 16 wherein the current carrying member has an axis, the circles of magnets being centred on said axis.

18. A machine according to claim 17 wherein the current carrying member is a rotor rotatable about the axis, the circles of magnets and the diverting members forming a stator assembly.

19. An electrical machine in which a disc-shaped current carrying rotor having a rotational axis is acted upon by and rotatable relative to a series of permanent magnets arranged to provide a stator producing a magnetic field with which the current in said rotor interacts, said series comprising at least first and second circular sub-series which are centered on the rotational axis and which are relatively rotatable about the axis to vary the interacting field, wherein associated with said series of permanent magnets is a corresponding series of magnetically permeable pole pieces arranged in a circle between said series of permanent magnets and said rotor, the permanent magnets of one said sub-series being attached to first portions of respective said pole pieces, and the permanent magnets of the other sub-series being registrable by said relative rotation with second portions of the respective pole pieces.

20. A machine according to claim 19 wherein in each said sub-series the permanent magnets are alternately oppositely polarized, and wherein when the permanent magnets of said second sub-series are in register with the pole pieces attached to similarly polarized permanent magnets of the first sub-series, the magnetic field passing through the rotor is at its strongest.

21. A machine according to claim 19 and having a further said series of permanent magnets comprising further said first and second sub-series and a further said series of pole pieces, the current carrying rotor being sandwiched between the two series of permanent magnets.

* * * * *

UNITED STATES PATENT AND TRADEMARK OFFICE
CERTIFICATE OF CORRECTION

PATENT NO. : 4,823,039

DATED : April 18, 1989

INVENTOR(S) : Cedric Lynch

It is certified that error appears in the above-identified patent and that said Letters Patent is hereby corrected as shown below:

Delete the title page and substitute the attached title page.
Add the 6 Drawing Sheets, containing Figs. 1, 2, 3A, 3B, 4, 5, 6, 7, 8 and 9, as shown on the attached pages. (Apply to Grant only.)

| | | |
|---|---|---|
| Col. 4 | Line 36 | Change "A" to -- As --. |
| Col. 5 | Line 12 | Change "concentrated" to -- concentrate --. |
| | Line 31 | Change "form" to -- from --. |
| | Line 32 | Change "pieces" to -- piece --. |
| Col. 6 | Line 4 | Change "section" to -- sections --. |
| | Line 41 | Change "branches" to -- brushes --. |
| Col. 7 | Line 27 | Change "surface" to -- surfaces --. |
| | Line 32 | Change "portion" to -- portions --. |
| | Line 40 | Change "surface" to -- surfaces --. |
| | Line 41 | Change "surface" to -- surfaces --. |
| | Line 41 | Change "surface" to -- surfaces --. |
| | Line 52 | After "claim", insert -- 1, --. |
| | Line 56 | Change the numeral "6" to -- 5 --. |
| | Line 63 | Change "flow" to -- flows --. |
| | Line 68 | After "and", insert -- a --. |

UNITED STATES PATENT AND TRADEMARK OFFICE
CERTIFICATE OF CORRECTION

PATENT NO. : 4,823,039
DATED : April 18, 1989
INVENTOR(S) : Cedric Lynch

It is certified that error appears in the above-identified patent and that said Letters Patent is hereby corrected as shown below:

Col. 8,     Line 12    Change "the" to -- in --.
            Line 44    Change "flow" to -- flows --.

Signed and Sealed this

Twenty-eighth Day of November 1989

Attest:

JEFFREY M. SAMUELS

*Attesting Officer*      *Acting Commissioner of Patents and Trademarks*

United States Patent [19]

Lynch

[11] Patent Number: 4,823,039
[45] Date of Patent: Apr. 18, 1989

[54] ELECTRICAL MACHINES

[76] Inventor: Cedric Lynch, 8 Heath Dr., Potters Bar, Hertfordshire, England, EN6 1EH

[21] Appl. No.: 944,234

[22] Filed: Dec. 18, 1986

[30] Foreign Application Priority Data

Dec. 18, 1985 [GB] United Kingdom ............... 8531212

[51] Int. Cl.$^4$ ................................................ H02K 1/22
[52] U.S. Cl. ................................... 310/268; 310/190; 310/191; 310/207; 310/237; 310/254
[58] Field of Search .............. 310/268, 115, 254, 116, 310/83, 42, 152, 154, 155, 207, 237, 136, 140, 219, 230, 101, 190, 191, 93, 103

[56] References Cited

U.S. PATENT DOCUMENTS

| 3,566,165 | 2/1971 | Lohr. | |
|---|---|---|---|
| 3,648,360 | 3/1972 | Tucker | 310/268 |
| 3,822,390 | 7/1974 | Janson | 310/268 |

FOREIGN PATENT DOCUMENTS

| 0008049 | 2/1980 | European Pat. Off. | |
|---|---|---|---|
| 1181796 | 11/1964 | Fed. Rep. of Germany | 310/268 |
| 2314591 | 10/1973 | Fed. Rep. of Germany | 310/268 |
| 2550416 | 5/1977 | Fed. Rep. of Germany | 310/154 |
| 1232489 | 8/1960 | France. | |
| 1426280 | 12/1965 | France. | |
| 1433531 | 2/1966 | France. | |
| 1496835 | 10/1967 | France. | |
| 0353071 | 5/1961 | Switzerland. | |
| 0832904 | 4/1960 | United Kingdom. | |
| 0836420 | 6/1960 | United Kingdom. | |
| 0925293 | 5/1963 | United Kingdom. | |
| 0926934 | 5/1963 | United Kingdom. | |
| 0955408 | 4/1964 | United Kingdom. | |
| 0992896 | 5/1965 | United Kingdom. | |
| 1051467 | 12/1966 | United Kingdom. | |
| 1072992 | 6/1967 | United Kingdom. | |
| 1133797 | 11/1968 | United Kingdom. | |
| 1153780 | 5/1969 | United Kingdom. | |
| 1170637 | 11/1969 | United Kingdom. | |
| 1172372 | 11/1969 | United Kingdom. | |
| 1193014 | 5/1970 | United Kingdom. | |
| 1509469 | 5/1978 | United Kingdom. | |
| 1545227 | 5/1979 | United Kingdom. | |
| 0325287 | 2/1980 | United Kingdom. | |
| 2059175 | 9/1980 | United Kingdom. | |
| 2060270 | 4/1981 | United Kingdom. | |
| 2081521 | 2/1982 | United Kingdom. | |
| 2103429 | 2/1983 | United Kingdom. | |
| 0966588 | 6/1984 | United Kingdom. | |
| 8002088 | 10/1980 | World Int. Prop. O. | 310/268 |

OTHER PUBLICATIONS

Principles of Electricity Illustrated; R. C. Norris; 1961; (3 pages).
"The Penguin Dictionary of Physics"; V. H. Pitt; 1977; 3 pages; Gr. Britain.

Primary Examiner—R. S. Skudy
Attorney, Agent, or Firm—Hopgood, Calimafde, Kalil, Blaustein & Judlowe

[57] ABSTRACT

There is disclosed a rotor for an electrical machine, the rotor having a current-carrying winding comprising a plurality of circumferentially distributed winding portions which lie in at least one plane perpendicular to the rotor axis, and extend from a radially inner region to a radially outer region. A commutator is provided by surfaces of the winding portions at the inner region, and the winding is formed from a plurality of conductive sections, each having ends which lie at said outer region, interconnections between the winding sections being made only by way of those ends. Thus, soldered connections made between the winding sections will be remote from the commutator, which is the main source of heat for overheating, and moreover will be at positions where air cooling due to rotor movement is greatest. Air gaps between the winding portions at the outer region aid this cooling affect even further.

21 Claims, 6 Drawing Sheets